United States Patent [19]
Tokunaga et al.

[11] Patent Number: 4,465,967
[45] Date of Patent: Aug. 14, 1984

[54] CURRENT SUPPLY CIRCUIT

[75] Inventors: Michio Tokunaga, Zushi; Junjiro Kitano, Fujisawa; Akio Sagawa, Hitachi; Toshio Hayashi, Iruma; Kazuo Hamazato, Tokyo, all of Japan

[73] Assignees: Hitachi, Ltd.; Nippon Telegraph & Telephone Public Corporation, both of Tokyo, Japan

[21] Appl. No.: 342,791

[22] Filed: Jan. 26, 1982

[30] Foreign Application Priority Data

Jan. 28, 1981 [JP] Japan ................................. 56-10244
Jan. 28, 1981 [JP] Japan ................................. 56-10246

[51] Int. Cl.³ ................................................ G05F 1/46
[52] U.S. Cl. ....................................... 323/285; 179/70
[58] Field of Search ................... 323/282, 284–287, 323/266; 307/4, 43–45, 52, 60; 179/70, 77

[56] References Cited
U.S. PATENT DOCUMENTS 4,203,009  5/1980  Tattersall .......................... 179/70 X
4,278,930  7/1981  Rogers ................................ 323/285
4,315,106  2/1982  Chea, Jr. ........................... 179/70 X
4,315,207  2/1982  Apfel ................................. 179/70 X Primary Examiner—Peter S. Wong
Attorney, Agent, or Firm—Antonelli, Terry & Wands

[57] ABSTRACT

A current supply circuit comprises a DC power feed circuit exhibiting a constant current characteristic for a power source and a constant resistance characteristic for a load, a first detecting circuit for detecting a load current or a load voltage, a DC-DC converter circuit inserted between the power source and the DC power feed circuit, a second detecting circuit for detecting an output voltage from the DC-DC converter circuit; and an operation circuit coupled at the input with the output of the first detecting circuit and the output of the second detecting circuit for controlling the DC-DC converter circuit by the output thereof. The DC-DC converter circuit is so controlled as to produce a voltage representative of the sum of a voltage drop across the load and a fixed voltage necessary for the operation of the DC power feed circuit.

8 Claims, 14 Drawing Figures

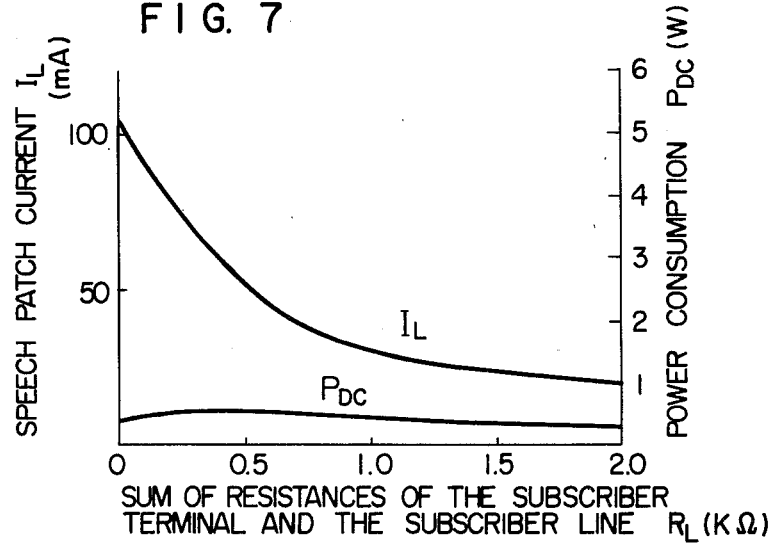
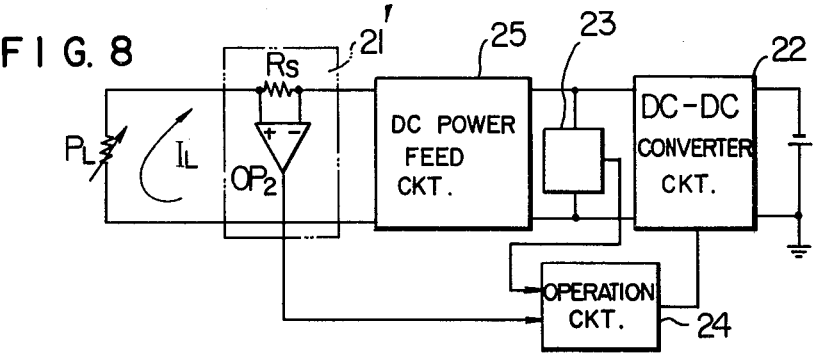
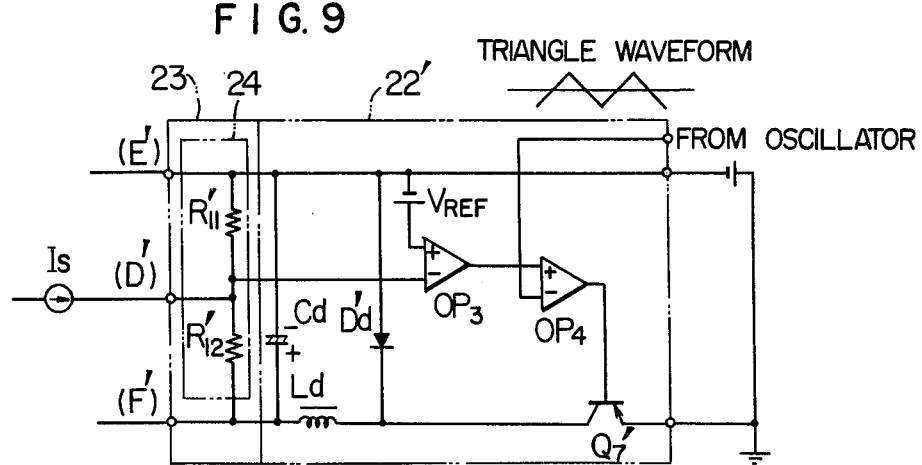

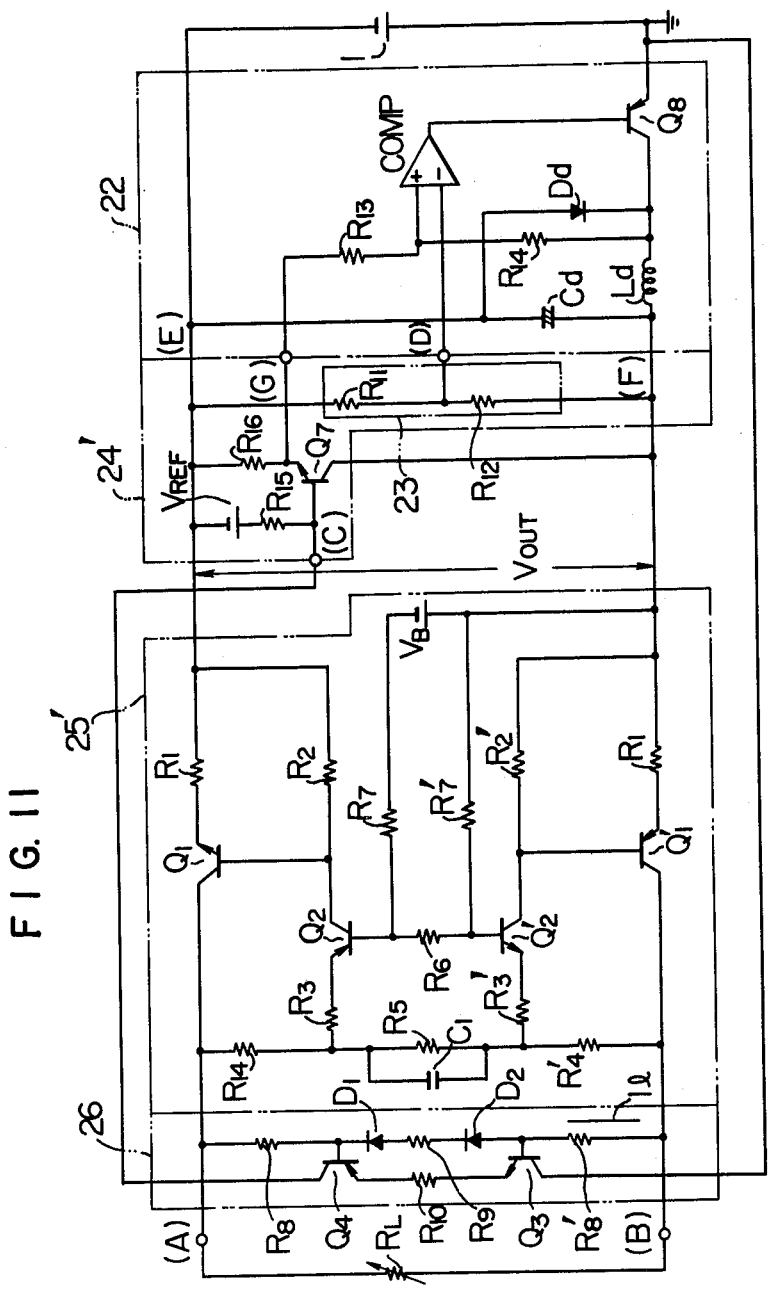
F I G. 11

CURRENT SUPPLY CIRCUIT

The present invention relates to a current supply circuit for use in a subscriber circuit of a telephone exchange system.

The prior art, the present invention and advantages of the latter will be described in detail with reference to the accompanying drawings, in which:

FIG. 7 shows characteristic curves of speech path current and power consumption of the circuit shown in FIG. 5;

FIG. 8 is a circuit diagram of another embodiment of a load current detecting circuit used in the present invention;

FIG. 9 is a circuit diagram of another embodiment of a DC-DC converter circuit used in the present invention;

FIGS. 11 to 14 are circuit diagrams of four embodiments of the current supply circuit illustrated in FIG. 10.

With advances in semiconductor technology, electronic systems gradually have been introduced into the telephone exchange, most of which heretofore has been made up of electromagnetic parts, and such redesign has particularly occurred in its central control system. Electronic parts such as semiconductor integrated circuit devices have been used widely, providing a miniaturization and a high performance of the telephone exchange system.

Figure 1:
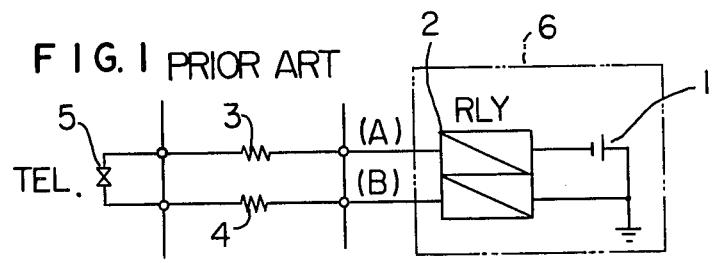
FIG. 1 shows a circuit diagram of a prior current supply circuit.

The sections in the telephone exchange system for directly transmitting signals to the subscriber lines, such as the trunks and the speech path switch network, handles a signal at a high level or often is accidentally impressed with an excessively high voltage of several hundreds of volts, for example, in the case of lightning strikes or accidental contact of the telephone lines with power transmission lines. These system sections have a difficulty in their circuit compatibility with electronic systems which are rated for handling signals at low signal levels of several volts. For this reason, full advantage has not been taken of advances in electronic technology for the circuit design of such system sections. FIG. 1 shows an example of a current supply circuit using electromagnetic parts which has been used in a speech path current supply trunk in a telephone exchange system. A speech current is fed from a battery 1 in the speech current supply trunk to a subscriber terminal (TEL) 5, by way of a relay (RLY) 2 and a subscriber line (a battery line (A) and a grounding line (B)). The rated voltage of the battery 1 is high, −48 V, and the speech current increases up to 120 mA maximum with a variation of the load condition in the subscriber section. In designing the circuit shown in FIG. 1, the difficulty encountered is an extremely large power consumption in the current supply circuit 6, in addition to the large level of the signal handled. This difficulty hinders the introduction of the electronics technology into the circuit, that is, the fabrication of the circuit into a semiconductor integrated circuit.

To further discuss this, the power consumption $P_{DC}$ and the speech current $I_L$ in the current supply circuit 6 shown in FIG. 1 are $$I_L = \frac{V_{BB}}{R_L + R_{in}} \quad (1)$$

$$P_{DC} = R_{in}\left(\frac{V_{BB}}{R_L + R_{in}}\right)^2 \quad (2)$$

where $R_L$ is the sum of the resistances of the subscriber terminal and the subscriber line, Rin is the DC internal resistance of the relay RLY, and $V_{BB}$ is the battery voltage.

Figure 2:
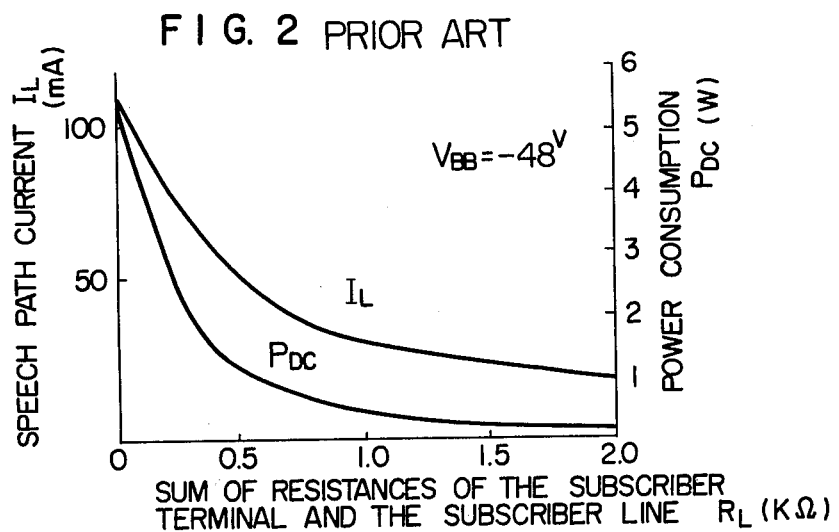
FIG. 2 shows a graphical representation of a relationship of a speech path current and power consumption.

Characteristic curves of the power consumption and the speech current plotted for nominal values of 48 V and 440 ohms for $V_{BB}$ and $R_{in}$, and 0 to 1700 ohms for the sum resistance $R_L$ are applied to the above equations (1) and (2), are as shown in FIG. 2. The current supply circuit 6 has 5.4 W maximum for power consumption. Accordingly, the power consumption must be reduced in designing the circuit for electronic technology.

Figure 3:
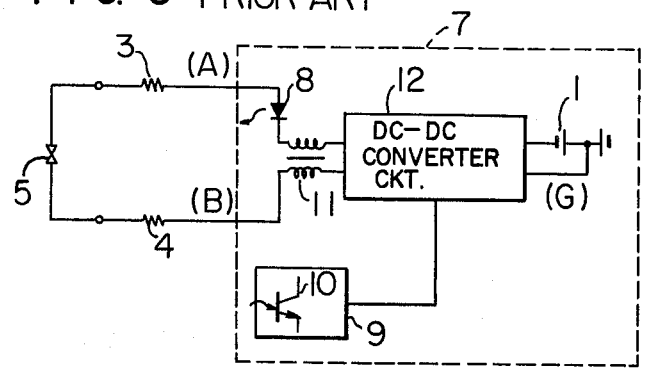
FIG. 3 is a circuit diagram of a prior current supply circuit using a DC-DC converter circuit.
Figure 4:
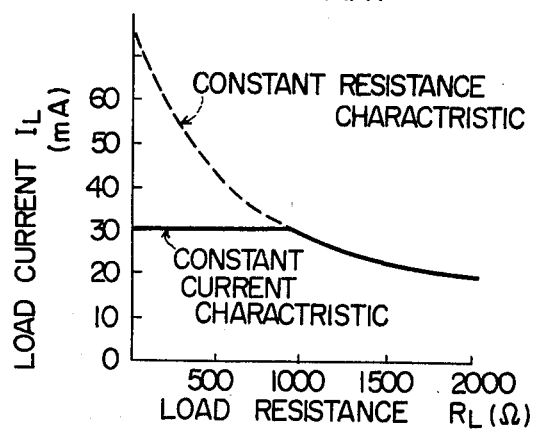
FIG. 4 shows a graphical representation of a load current characteristic of the circuit of FIG. 3.

To this end, a measure has been proposed in which a DC-DC converter circuit is introduced into the current supply circuit to reduce the power consumption of the circuit. FIG. 3 shows an example of this proposal, as disclosed Japanese Patent application (KOKAI) No. 50207/79. In FIG. 3, like numerals designate like portions in FIg. 1. In the figure, reference numeral 7 designates a current supply circuit; 8 a light emitting diode for load current detection; 9 a control circuit; 10 a photo transistor optically coupled with the light emitting diode 8 in the control circuit 9; 11 a choke coil; and 12 a DC-DC converter circuit. A load current flows through a route from ground (G) through the DC-DC converter circuit 12—choke coil 11—line resistor 4—subscriber terminal 5—line resistor 3—light emitting diode 8—choke coil 11—DC-DC converter circuit 12—battery 1. The choke coil 11 prevents speech loss and the leakage of switching noise in the DC-DC converter circuit 12 into the line. The load current is fed back to the control circuit 9 through the diode 8 and the transistor 10. When the load current exceeds a set value, the output voltage of the DC-DC converter circuit 12 is reduced. Conversely, when it is below the set value, the output voltage increases. In this way, the output voltage of the DC-DC converter circuit 12 is automatically controlled so that the load current is always at a fixed value. A current feed characteristic of the circuit thus arranged as shown in FIG. 3 is shown in FIG. 4. The resistance of the load resistor $R_L$ is the sum of the resistances of the line resistor and the subscriber terminal. In a region where the load resistance is small, the load current $I_L$ is constant and the power consumption is reduced. In the circuit arrangement shown in FIG. 3, however, the current feed characteristic is of the constant current type in a region where the line resistance is small, and is different from the constant resistance current feed characteristic of the prior current supply circuit. Therefore, this circuit fails to have a prefert compatibility with the prior circuit. The subscriber terminal contained in the telephone exchange is designed depending on the fact that the current feed characteristic of the current supply circuit is a constant resistance current feed characteristic, as shown in FIG. 2. Accordingly, in the case where a current feed characteristic partially exhibits a constant current characteristic, as shown in FIG. 4, some of the subscriber terminals can not be contained in the telephone exchange system. As a consequence, for effectively realizing the electronic telephone exchange system and the miniaturization of the system, it is necessary not only to replace the conventional electromagnetic circuit by the electronic circuit but also to reduce the power consumption of the circuit by keeping a perfect compatibility with the conventional telephone exchange system.

Accordingly, with the view of improving the defects of the prior art, the present invention has an object to provide a low power current feed circuit with an electrical characteristic compatible with the conventional circuit.

According to the present invention, there is provided a current supply circuit comprising a DC power feed circuit operable independently of a power source and having an equivalent internal resistance and an equivalent internal power source, a first detecting circuit for detecting a load current or a load voltage, a DC-DC converter circuit inserted between the power source and the DC power feed circuit, a second detecting circuit for detecting an output voltage of the DC-DC converter circuit, and an operation circuit for receiving the output signals from the first and second detecting circuits to control the DC-DC converter circuit on the basis of these signals, whereby the DC-DC converter circuit is controlled so as to produce the sum of a voltage drop across the load due to a change of the load resistance and a fixed voltage to allow the DC power feed circuit to operate.

The present invention will be described referring to the accompanying drawings.

Figure 5:
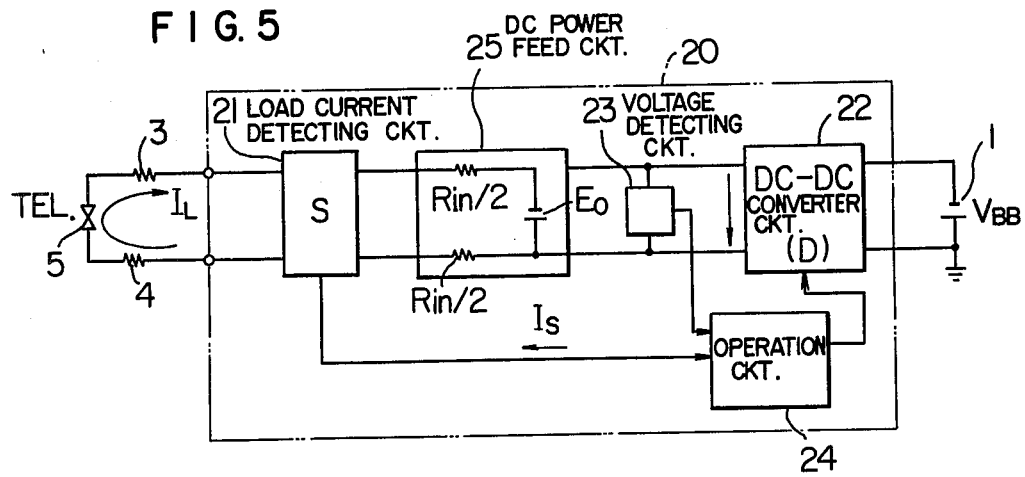
FIG. 5 is a fundamental circuit diagram illustrating the principle of a current supply circuit according to the present invention.

FIG. 5 is a block diagram useful in explaining the principle of the present invention. In the figure, reference numeral 1 designates a power source, 3 and 4 line resistance or resistors, 5 a subscriber terminal (TEL), 20 a current supply circuit, 21 a load current detecting circuit, 22 a DC-DC converter circuit, 23 a voltage detecting circuit for detecting an output voltage of a DC-DC converter circuit 22, 24 an operation circuit, 25 a DC power feed circuit having an equivalent internal resistance and an equivalent internal power source.

The operation of the circuit will be described. The DC power feed circuit 25 is electrically expressed by a combination of a DC internal resistance Rin, which may be considered to be made up of two resistors as shown, and an equivalent internal power source Eo. The power source Eo is the one given by a constant voltage source or a constant current source in the circuit, which is operable independently of the power source $V_{BB}$. Therefore, the load current $I_L$ flowing through the subscriber terminal 5 and the line resistors 3 and 4 is independent from the output voltage $V_{OUT}$ of the DC-DC converter circuit 22. The power feed characteristic for the load of the DC power feed circuit 25, independently of the voltage $V_{OUT}$, is given as $$I_L = E_o/(R_L + R_{in}) \quad (3)$$

where $R_L$ is the sum of the DC resistances of the subscriber terminal (TEL) 5 and the line resistances 3 and 4. The DC-DC converter circuit 22, containing a reference voltage, has such a control characteristic as to provide a reduced output voltage when the control input voltage exceeds the reference voltage and to provide an increased output voltage when the control input voltage falls below the reference voltage. The operation circuit 24 receives an output current $I_S$ of the load current detecting circuit 21 and an output signal from the voltage detecting circuit 23 to produce a voltage representing the sum of a voltage proportional to the load current $I_L$ and a voltage proportional to the output voltage $V_{OUT}$ of the DC-DC converter circuit 22. Assume now that the load current $I_L$ flows through the load resistor RL. If the output voltage $V_{OUT}$ of the DC-DC converter circuit 22 is larger than the sum of the voltage drop ($=R_L I_L$) across the load resistor $R_L$ and the minimum operation voltage $V_{CEM}$ of the DC power feed circuit 25, a relationship will exist as given by the equation (4), $$V_{OUT} \geq R_L I_L + V_{CEM} \quad (4)$$

The DC power feed circuit 25 reliably operates with the power feed characteristic as given by the equation (3). Since the DC resistance of the DC power feed circuit 25 is Rin as viewed from the load, the voltage drop across the DC power feed circuit 25 is Rin $\times I_L$. When the DC power supply circuit 25 is constructed using electronic technology, the actual voltage drop $V_{CEM}$ may be approximately a non-saturated voltage (1 to 2 V) of the transistor constituting the circuit. Accordingly, the value of $V_{CEM}$ may be much smaller than that of Rin $\times I_L$. As described above, the load current $I_L$ detected by the load current detecting circuit 21 and the voltage detecting circuit 23 and the output voltage $V_{OUT}$ of the DC-DC converter circuit 22 are summed by the operation circuit 24 and the sum is applied to the control input of the DC-DC converter circuit 22. The output voltage $V_{OUT}$ of the DC-DC converter circuit 22 is selected so that that voltage is equal to the reference power source voltage $V_{REF}$. That is to say, the following equation holds $$K1 I_L + K2 V_{OUT} = V_{REF} \quad (5)$$

Hence, $$V_{OUT} = V_{REF}/K2 - K1 K_L/K2 \quad (6)$$

The equation (6) indicates that the output voltage from the DC-DC converter circuit 22 is controlled by the load current $I_L$. From the equation (3), the power supply characteristic is determined only by the load resistor $R_L$. Therefore, the load voltage drop $R_L \times I_L$ may be detected by detecting the load current $I_L$ ($I_L = E_o/R_{in} - (R_L \times I_L)/R_{in}$). When substituting this equation into the equation (6), the output voltage $V_{OUT}$ of the DC-DC converter circuit 22 is given $$V_{OUT} = \left(\frac{V_{REF}}{K2} - \frac{K1}{K2} \frac{E_o}{R_{in}}\right) + \frac{K1}{K2} \cdot \frac{1}{R_{in}} \cdot R_L \cdot I_L \quad (7)$$

To obtain the control characteristic of the equation (4), by comparing the equations (7) and (4), the constants K1 and K2 and the reference voltage $V_{REF}$ must be selected to satisfy the following relations $$(K1/K2) \cdot (1/Rin) = 1 \qquad (8)$$

$$(V_{REF}/K2) - Eo \geq V_{CEM} \qquad (9)$$

In this way, the output voltage from the DC-DC converter circuit 22 may be controlled to be a voltage approximate to the sum of the voltage drop ($R_L \times I_L$) across the load resistor and the minimum operation voltage ($V_{CEM}$) of the DC power feed circuit 25, as shown in FIG. 4, by an arrangement that the DC-DC converter circuit is controlled on the basis of the result of operating the load current $I_L$ and the output voltage of the DC-DC converter circuit 22.

In the prior circuit, the power consumption given by the product of a difference voltage ($=V_{BB}-R_{LL}$) between the power source voltage $V_{BB}$ and the voltage drop $R_L \times I_L$ across the load resistor $R_L$, and the load current $I_L$ is consumed in the current supply circuit 6. In the present invention, it is allowed that the power source voltage of the DC power feed circuit 25 is merely above ($V_{CEM}+V_L I_L$). Accordingly, the power consumption of the current supply circuit 20 may be reduced while keeping the conventional characteristic by dropping the output voltage $V_{OUT}$ between ($V_{CEM}+R_L I_L$) and $V_{BB}$ through the control of the DC-Dc converter circuit 22.

Figure 6:
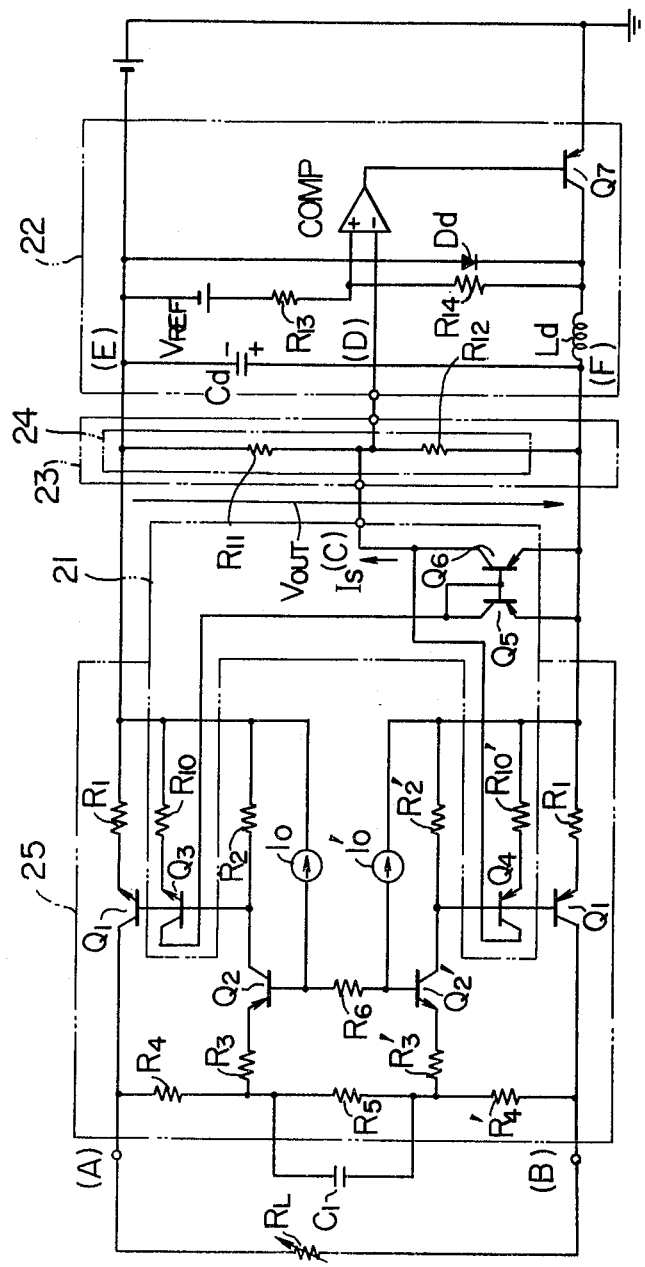
FIG. 6 is a circuit diagram of a practical arrangement of the circuit shown in FIG. 5.

Turning now to FIG. 6, there is shown a first practical arrangement of the present invention in which the voltage drop in the DC power feed circuit is fixed at the level of $V_{CEM}$. In the figure, reference numeral 25 denotes a DC power feed circuit; 21 a load current detecting circuit; 22 a DC-DC converter circuit; 23 a voltage detecting circuit for detecting the output voltage $V_{OUT}$ of the DC-DC converter circuit 22; 24 an operation circuit also having the function of the voltage detecting circuit 23. $R_L$ represents the sum of the line resistance and the DC resistance of the subscriber terminal. The operation of the DC power feed circuit 25 is described in detail in Japanese Unexamined Patent application (KOKAI) No. 42449/70, and hence its function will be described here only briefly. The DC power feed circuit constitutes a negative feedback circuit of which the upper and lower parts are complementarily symmetrical. When viewed from the subscriber lines (A) and (B), the circuit has a low resistance (440 ohms) in a DC mode, but has a high impedance (about 30 Kilo ohms) in an AC mode. The circuit operates like the conventional relay (RLY) of the conventional circuit shown in FIG. 1. Io and Io' denote respectively constant current sources. These circuits may each be realized by a simple transistor circuit such as a current mirror. Accordingly, these are illustrated by mere symbols in this drawing. When the bases of the transistors Q2 and Q2' are driven by the constant current sources, the DC power feed circuit operates independently of the power source. The load current $I_L$ is given by the following equation under a condition that $h_{FE}$ of the transistor is infinitive and the base-emitter voltage $V_{BE} \approx 0$, $$I_L = \frac{Eo}{R_L + Rin} \qquad (10)$$

$$Eo = IoR_6 \frac{2R4\frac{R_2}{R_1} + R_5\left(1 + \frac{R_2}{R_1}\right)}{2R3 + R_5\left(1 + \frac{R_2}{R_1}\right)} \qquad (11)$$

$$Rin = 2R4 \frac{2R5 + R_5\left(1 + \frac{R_3}{R_4}\right)}{2R3 + R_5\left(1 + \frac{R_2}{R_1}\right)} \qquad (12)$$

where R1=R1', R2=R2', R3=R3', R4=R4', R5=R5', Io=Io').

As indicated by the equations (11) and (12), Eo and Rin have fixed values determined by the circuit constants. An output current proportional to the load current $I_L$ may be detected from the voltage drops across the resistors R1 and R1'. The current proportional to the load current of the battery line (A) flows through the collector of the transistor Q3 in the load current detecting circuit 21. On the other hand, the current proportional to the load current of the ground line (B) flows through the collector of the transistor Q4. Since the directions of the currents of the transistor Q3 and Q4 are opposite to each other, the collector current of the transistor Q4 is inverted by the current mirror circuit made up of transistors Q5 and Q6, thereby to provide from the output terminal (C) a detected current proportional to the sum of the load currents of the ground lines (B) and (A). This method of detecting the load current using the sum of the currents of the battery lines (A) and (B) has an advantage of preventing an erroneous operation due to the induction current in an in-phase mode. In the load current detecting circuit 21 of FIG. 6, when the $h_{FE}$'s of the transistors Q3 and Q4 are satisfactorily large, the base currents of the transistors Q3 and Q4 are satisfactorily small. Therefore, the influence on the DC power feed circuit 25 is almost negligible.

In the DC-DC converter circuit 22, the voltage comparator COMP1 and the switching transistor Q7 is combined with a positive feedback circuit including resistors R14 and R13, to make a self-oscillation at a frequency given by a choke coil Ld and a smoothing capacitor Cd. Dd designates a commutation diode for commutating the backward current in the choke coil Ld into the load during an off-period of the transistor Q7. A reference voltage $V_{REF}$ is applied to the (+) input of the comparator COMP 1, while a control input (D) of the DC-DC converter circuit 22 is coupled to the (−) input of the comparator. It is assumed that a voltage between the terminals (E) and (A) is a control input voltage. When the control input voltage is larger than the reference voltage $V_{REF}$, the output signal of the voltage comparator COMP 1 turns off the transistor Q7, so that the output voltage $V_{OUT}$ decreases. The control input voltage, when the output current $I_S$ of the load current detecting circuit 21 is "0", is given by R11/(R11+R12)×$V_{OUT}$ where R12 and R11 are resistors constituting the voltage detecting circuit 23. As a result, a voltage proportional to an output voltage of the DC-DC converter circuit 22 is produced.

When the output voltage of the DC-DC converter circuit 22 is "0", the resistors R12 and R11 provide a voltage defined by (R11×R12)/(R11+R12)×$I_S$ proportional to the output current $I_S$ of the load current detecting circuit 21. The principle of superposition provides the control input voltage $V_{(E),(D)}$ given by the following equation $$(V_{(E),(D)}) = \frac{V_{OUT} + I_S R12}{1 + \frac{R12}{R11}} \qquad (13)$$

As described above, the circuit made up of the resistors R12 and R11 serves as the voltage detecting circuit 23 for detecting an output voltage of the DC-DC converter circuit 22, and also serves as the operation circuit 24 to provide a voltage representing the sum of the voltage proportional to the output current of the load current detecting circuit 21 and the output voltage of the voltage detecting circuit 13.

The reason why the two functions are realized by the single circuit is that the voltage detection of the DC-DC converter circuit 22 is performed in a voltage mode and the current detection of the load current detecting circuit is performed in a current mode. In embodying the present invention, the output modes of these circuits may both be the voltage mode or the current mode. In this case, however, the two functions can not be realized by the single circuit, so that the circuit construction is complicated.

The output voltage $V_{OUT}$ of the DC-DC converter circuit 22 is settled down so that the control input voltage $V_{(E),(D)}$ is equal to the reference voltage $V_{REF}$. Accordingly, if $V_{(E),(D)} = V_{REF}$, the following relation holds $$V_{OUT} = \left(\frac{R12}{R11} + 1\right) V_{REF} - R12 I_S \qquad (14)$$

The voltage drop across the load resistor $R_L$ changes by the load current $I_L$ in accordance with the following relation $$V_L = R_L I_L \qquad (15)$$
$$= E_o - R_{in} I_L$$

The power consumption in the DC power feed circuit 25 may be minimized by controlling the DC-DC converter circuit 22 so that the sum of the minimum voltage drop $V_{CEM}$ for correcting the active operation of the DC power feed circuit 25 and the voltage drop $V_L$ across the load resistor $R_L$ is equal to the output voltage $V_{OUT}$ of the DC-DC converter circuit 22. That is to say, the output voltage $V_{OUT}$ of the DC-DC converter circuit 22 must be controlled as follows.

$$V_{OUT} = V_{CEM} + V_L \qquad (16)$$

If the output voltage $V_{OUT}$ above the voltage given by the equation (16) is secured, the DC power feed circuit 25 normally operates, so that the load current $I_L$ allows the circuit to hold the constant resistance current feed characteristic identical with that of the prior circuit. As seen from the equation (15), the voltage $V_L$ is obtained from the load current $I_L$. Therefore, the output voltage $V_{OUT}$ may be controlled in accordance with the following equation by detecting the load current $I_L$.

$$V_{OUT} = V_{CEM} + E_o - R_{in} I_L \qquad (17)$$

Since the control characteristic of the DC-DC converter circuit 22 is given by the equation (14), if the converting coefficient between the detected current Is of the load current detecting circuit 21 and the load current $I_L$ is defined by $$I_L = K1 I_S \qquad (18)$$

it is evident that the following relations hold in order that the DC-DC converter circuit 22 obtains the control characteristic defined by the equation (17).

$$\left(\frac{R12}{R11} + 1\right) V_{REF} = V_{CEM} + E_o \qquad (19)$$

$$R12 = R_{in} K_I \qquad (20)$$

The power consumption $P_{DC}$ of the overall current supply circuit 20 having the control characteristic given by the equation (17) is $$P_{DC} = V_{CEM} \cdot I_C + V_{OUT} I_L \frac{1 - \eta}{\eta} \qquad (21)$$

$$= \frac{V_{CEM} \cdot V_{BB}}{\eta(R_L + R_{in})} + R_L \left(\frac{V_{BB}}{R_L + R_{in}}\right)^2 \left(\frac{1}{\eta} - 1\right)$$

where $\eta$ is a converting efficiency of the DC-DC converter circuit 22.

The result of the calculation of the $P_{DC}$ performed under the conventional condition is illustrated in FIG. 7. In the calculation, $V_{BB}=48$ V, $V_{CEM}=3$ V, $\eta=0.8$, and $R_{in}=440$ ohms. The maximum power consumption of the current supply circuit of the prior circuit is 5.4 W. The maximum power consumption of the overall current supply circuit 20 in FIG. 5 is 0.5 W, i.e. reduced to about 1/10. The entirety of the current supply circuit may be fabricated into one IC chip. As described above, in the current supply circuit arranged according to the present invention, the power consumption is remarkably reduced while keeping the same characteristic as that of the conventional circuit. Therefore, the problems of the heat radiation and the compatibility with the conventional system are successfully solved. As a result, it is possible to provide high density-packed telephone exchange system by making use of the electronic devices.

When the voltage drop across the resistors R1 and R1' in the DC power feed circuit 25, which also serve to detect the load current, are not negligible, the control characteristic of the DC-DC converter circuit 22 is set up allowing for the voltage drop across the load current detecting resistor. If it is assumed that the sum of the minimum operation voltages of the transistors Q1 and Q1' is $V_{CEM}$, the output voltage $V_{OUT}$ required for the DC-DC converter circuit is given by the following equation $$V_{OUT} = (R_L + 2R_1)I_L + V_{CEM} \qquad (22)$$

$$= V_{BB} + V_{CEM} - (R_{in} - 2R_1)I_L$$

As seen from the equation, all a designer has to do is to change the coefficient of $I_L$ of the control characteristic $V_{OUT} = V_{BB} + V_{CEM} - R_{in} I_L$ of the DC-DC converter circuit 22 shown in FIG. 6 to the $(R_{in} - 2R1)$. As seen from the foregoing, the current supply circuit of the present invention enables the power consumption of the current supply circuit to be minimized by considering even a slight amount of the voltage drop across the detecting resistor in the load current detecting circuit.

In the embodiment of the load current detecting circuit 21 shown in FIG. 6, according to the present invention, the load current detecting resistor is contained in the DC power feed circuit 25. This arrangement for detecting the load does not limit the present invention. Alternatively, the arrangement may be realized by merely inserting a differential amplifier OP2 and a current detecting resistor Rs in series in the subscriber line, as shown in FIG. 8. The DC-DC converter circuit 22 is of the self-oscillation switching type in the embodiment of FIG. 6, but it may be of any type if the output voltage is controlled by the voltage or current input signal.

An example of such is a DC-DC converter circuit 22' of the separately excition switching type, as shown in FIG. 9. The DC-DC converter circuit 22', called a pulse-width control type DC-DC converter circuit, controls the output voltage by changing the ON-time width of a switching transistor Q7', with fixed oscillating periods (coincident with those of an external oscillator). The circuit operation of the converter is exactly the same as that of the DC-DC converter circuit 22 shown in FIG. 6, except that the switching operation is performed under control of the external oscillator. Accordingly, an explanation of the circuit operation will be omitted. As in the DC-DC converter circuit 22 shown in FIG. 6, the circuit operation is balanced when a potential difference between the + input and − input of the operational amplifier OP is nearly zero. The output voltage of the DC-DC converter circuit 22' shown in FIG. 9 is defined by the same equation as the equation (14). The DC-DC converter circuit 22' shown in FIG. 9 is replaceable with the DC-DC converter circuit 22 shown in FIG. 6. In accordance with the present invention, the separate excitation switching type DC-DC converter circuit may be used for the DC-DC converter circuit. In recent years, high speed switching transistors have been provided to increase the switching frequency up to about 100 kHz and the core material is improved to allow the choke coil to be miniaturized, and the smoothing capacitor CD may be made small. When those improved elements are applied to the DC-DC converter circuit shown in FIG. 6 or 9, the current supply circuit may be miniaturized without deteriorating the miniaturization and high density packaging arising from the use of the electronic circuit.

As seen from the foregoing description, the current supply circuit according to the present invention is well adaptable for the fabrication of its circuit by electronic components of low power consumption, realizing miniaturized electronic telephone exchange systems.

Figure 10:
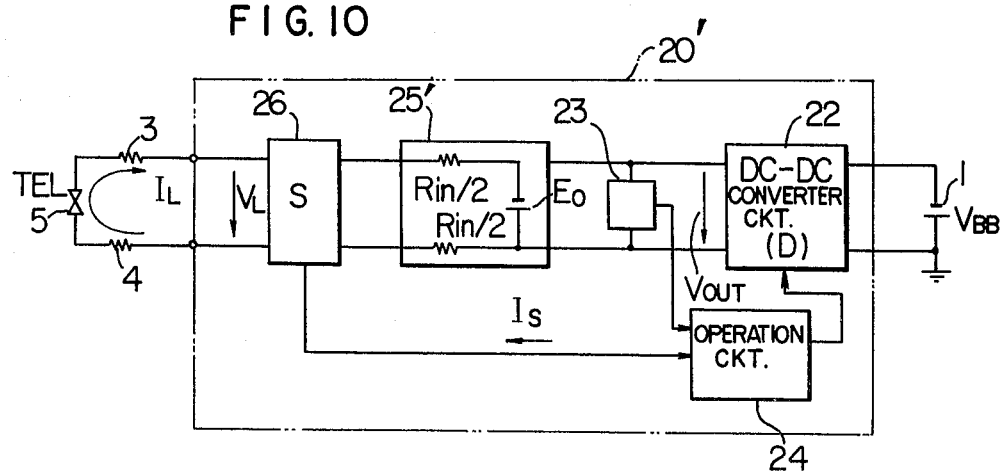
FIG. 10 shows a second fundamental circuit diagram of a current supply circuit according to the present invention.

In the above-mentioned embodiments shown in FIGS. 5 to 9, a change of the load voltage is detected using the load current. It is evident that the load volage itself may be detected for the load voltage change detection. A fundamental circuit for effecting this modification is illustrated in FIG. 10. A different point of the FIG. 10 embodiment resides in that the load current detecting circuit 21 is replaced by a load voltage detecting circuit 26 and the detected output signal is applied to the operation circuit.

Also in the circuit shown in FIG. 10, if the output voltage $V_{OUT}$ of the DC-DC converter circuit 22 is above the sum of the voltage drop ($V_L = R_L \cdot I_L$) across the load resistor $R_L$ and the minimum operation voltage $V_{CEM}$ of the DC power feed circuit 25', the DC power feed circuit 25' operates with the power feed characteristic as given by the equation (3).

In this case, the load voltage $V_L$ detected by the load voltage detecting circuit 26 and the output voltage of the DC-DC converter circuit 22 detected by the voltage detecting circuit 23 are operated by the operation circuit 24, and the result of the operation is applied to the control input of the DC-DC converter circuit 22. The output voltage $V_{OUT}$ of the DC-DC converter circuit 22 is settled down so that the reference voltage $V_{REF}$ contained in the DC-DC converter circuit is equal to the output voltage $V_{OUT}$ of the DC-DC converter circuit 22. That is to say, the following equation holds where K1 and K2 are constant. Rearranging the equation, we have $$-K1 V_L + K2 V_{OUT} = V_{REF} \qquad (23)$$

$$V_{OUT} = (V_{REF}/K2) + (K1 V_L/K2) \qquad (24)$$

The equation 24 indicates that the output voltage of the DC-DC converter circuit 22 is controlled by the load voltage $V_L$.

In order to obtain the following relation equivalent to the relation (4), by comparing the equations (24) with the equation (25), the constants K1 and K2 and the reference voltage $V_{REF}$ must satisfy the following relations $$V_{OUT} \geqq V_L + V_{CEM} \qquad (25)$$

$$K1/K2 = 1 \qquad (26)$$

$$V_{REF}/K2 \geqq V_{CEM} \qquad (27)$$

The output voltage of the DC-DC converter circuit 22 may be controlled to about the sum of the voltage drop $V_L$ across the load resistor and the minimum operation voltage $V_{CEM}$ of the DC power feed circuit 25', as indicated by the equation (25), with an arrangement that the DC-DC converter circuit 22 is controlled by the result of the detected load voltage $V_L$ and the output voltage of operating the DC-DC converter circuit 22 detected by the load voltage V. Accordingly, the power consumption in the current supply circuit may be reduced keeping the conventional characteristic when the output voltage $V_{OUT}$ is dropped between the $V_{CEM} + V_L$ and $V_{BB}$ by controlling the DC-DC converter circuit 22.

Turning now to FIG. 11, there is shown a practical arrangement of the fundamental circuit shown in FIG. 10 in which the voltage drop in the DC power feed circuit is fixed at $V_{CEM}$. In the figure, reference numeral 25' designates an electronic power feed circuit, 26 a load voltage detecting circuit for detecting the output voltage ($V_{OUT}$) of the DC-DC converter circuit, 24' an operation circuit having part of the function of the voltage detecting circuit 23. $R_L$ designates a load resistance as the sum of the DC resistances of the line resistors and the subscriber terminal. The operation of the DC power feed circuit 25 is described in detail in Japanese Patent Application KOKAI (Laid-Open) No. 42449/80. Accordingly, the function of it will be described only briefly. As a whole, the circuit constitutes a negative feedback circuit of which the upper and lower portions are complementarily symmercial. The circuit exhibits a low resistance (approximately 440 ohms) as viewed from the subscriber lines (A) and (B), and exhibits a high impedance (approximately 30 Kilo ohms) in a DC mode. The circuit operates like the relay R2 (RLY) of the conventional circuit. The above-mentioned KOKAI application describes that the power feed characteristic of the DC power feed circuit 25' is given by the following equation $$I_L = \frac{E_o}{R_L + R_{in}} \quad (28)$$

Here, $$E_o = \frac{V_B R_7}{R_6 + 2R_7} \cdot \frac{2R_4 \frac{R_2}{R_1} + R_5\left(1 + \frac{R_2}{R_1}\right)}{2R_3 + R_5\left(1 + \frac{R_2}{R_1}\right)} \quad (29)$$

$$R_{in} = 2R_4 \frac{2R_3 + R_5\left(1 + \frac{R_3}{R_4}\right)}{2R_3 + R_5\left(1 + \frac{R_2}{R_1}\right)} \quad (30)$$

In the above equation, R1=R1', R2=R2', R3=R3', R4=R4', and R7=R7'. As indicated by the equations (29) and (30), the voltage Eo in the equivalent circuit and the DC internal resistance Rin in the DC power feed circuit 25' are constants determined by the circuit constants. Accordingly, the DC power feed circuit 25' operates independently from the power source.

In the load voltage detecting circuit 26, a combination of transistors Q3 and Q4 constituting a complementary current amplifier, a series circuit including diodes D1 and D2, high resistors R8, R9, and R8', and a resistor R10 provides a current proportional to the load voltage $V_L$ produced across the load resistor $R_L$ at the collector of the transistor Q4 of which the complementary input terminal is connected to the series circuit. The collector of the transistor Q3 is grounded. As a result, a voltage proportional to the load voltage $V_L$ is produced across the resistor R15. The voltage $V_{R15}$ is expressed as $$V_{R15} = \frac{R_{15}}{R_{10}} \cdot \frac{2R_8 + R_9}{R_9} V_L \quad (31)$$

where Rs'=Rs.

Thus, a voltage proportional to the load voltage $V_L$ appears at the input terminal (C).

The load voltage detecting circuit 26 applies a load influence caused by the detecting resistors R8, R9 and R8' to the DC power feed circuit 10. However, if the resistance of R8+R9+R8' is selected to be considerably larger than the DC internal resistance Rin, the load influence is negligible.

The ⊕ input of the voltage comparator COMP in the DC-DC converter circuit 22 is connected to the input terminal (G) to which a voltage to be a reference voltage is applied, and the ⊖ input terminal is connected to the input terminal (D) to which a voltage to be compared is applied. Since the amplification factor of the voltage comparator COMP is satisfactorily large, when the voltage at the terminal (D) is larger than that at the terminal (G), the voltage comparator COMP turns off the transistor Q8, so that the output voltage $V_{OUT}$ decreases. Conversely, when the voltage at the terminal (D) is smaller than the voltage at the terminal (G), the comparator turns on the transistor Q8, resulting in increase of the output voltage. The voltage detecting circuit 23, comprised of resistors R12 and R11, produces a voltage given by $R11/(R11+R12) \times V_{OUT}$, which is proportional to the output voltage $V_{OUT}$ of the DC-DC converter circuit 22. An operation circuit 24', containing the reference voltage $V_{REF}$, produces the sum of the voltage $V_{R15}$ proportional to a load voltage appearing across the resistor R15 and the reference voltage $V_{REF}$ at the emitter of the transistor Q7, with a low output resistance. The operation circuit 24' further contains the voltage detecting circuit 23, and provides a voltage of the sum of the voltage proportional to the load voltage $V_L$ and the reference voltage $V_{REF}$ at the output terminal connected to the terminal (G), and provides a voltage proportional to the output voltage $V_{OUT}$ of the DC-DC converter circuit 22 at the output terminal connected to the terminal (D). The reason why part of the function of the operation circuit 24' can be incorporated into the voltage detecting circuit 23 is that the ⊕ input and the ⊖ input of the comparator COMP in the DC-DC converter circuit are properly used. In the arrangement in which the reference voltage $V_{REF}$ is contained in the DC-DC converter circuit, only one input terminal is needed for coupling the operation circuit 24' with the DC-DC converter circuit 22. However, the operation circuit 24' is not simplified, as shown in FIG. 11. That is, the operation circuit needs a circuit for producing a difference voltage between the voltage proportional to the load voltage and the voltage proportional to the output voltage $V_{OUT}$ of the DC-DC converter circuit. The present invention may of course be reduced to practice with such a circuit arrangement. In this case, however, the voltage detecting circuit 23 can not have part of the function of the operation circuit 24'. As already described, the output voltage of the DC-DC converter circuit 22 is determined when the potential difference between the terminals (G) and (D) is "0". The operation circuit sets the voltage at the terminal (G) at $V_{REF}+KV_L$ and the voltage at the terminal (D) at $R11/(R11+R12) \times R_{OUT}$. Therefore, the following relation holds $$V_{OUT} = \left(1 + \frac{R12}{R11}\right)(V_{REF} + KV_L) \quad (32)$$

where K is constant. The equation (32) indicates that the output voltage of the DC-DC converting circuit is controlled by detecting the load voltage $V_L$.

The voltage drop across the load resistor $R_L$ varies with the load current $I_L$ in accordance with the following relation.

$$V_L = R_L \times I_L \quad (33)$$

If the DC-DC converter circuit 22 is so controlled that the sum of a minimum voltage drop $V_{CEM}$ to ensure the active operation of the DC power feed circuit 25' and the voltage drop across the load resistor $R_L$ is equal to the output voltage $V_{OUT}$ of the DC-DC converter circuit 22, the power consumption in the DC power feed circuit 25' may be minimized. The output voltage $V_{OUT}$ of the DC-DC converter circuit 22 must be controlled as follows.

$$V_{OUT} = V_{CEM} + V_L \quad (34)$$

The output voltage $V_{OUT}$ of the DC-DC converter circuit 22 is controlled in accordance with the equation (32) by detecting the load voltage $V_L$. Accordingly, in order to obtain the control characteristic of the equation (34), by comparing the equations (32) and (34), the circuit constants to satisfy the following relations are selected $$\left(1 + \frac{R12}{R11}\right) V_{REF} = V_{CEM} \tag{35}$$

$$\left(1 + \frac{R12}{R11}\right) K = 1 \tag{36}$$

where K is $$K = \frac{R15}{R10} \cdot \frac{2R_8 + R_9}{R9},$$

which is led from the equation (31).

Thus, if the output voltage $V_{OUT}$ above the voltage given by the equation (34) is secured, the DC power feed circuit operates normally. The load current $I_L$ can keep the same constant resistor characteristic as that of the conventional circuit. Therefore, the power consumption may be reduced without damaging the power feed characteristic. The power consumption of the circuit shown in FIG. 11 has of course that shown in FIG. 7.

Figure 12:
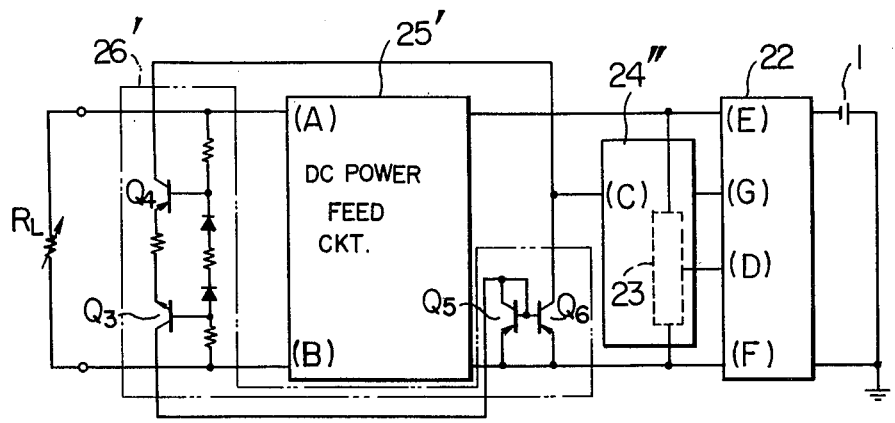

FIG. 12 shows a current feed circuit which is a second embodiment of the DC-DC converting circuit shown in FIG. 10. The arrangement of FIG. 12 is exactly the same as that of FIG. 11, except that a circuit construction of the load voltage detecting circuit is modified. In the embodiment shown in FIG. 11, the current proportional to the load voltage flows through the collector of the transistor Q3 constituting the load detecting circuit 26. Since the collector of the transistor Q3 is grounded, the current flows into ground, so that the detected current is not effectively used. The detected current output from the collector of the transistor Q3 is applied to the input (the base and collector of the transistor Q5) of a current mirror circuit (the mirror ratio is 1:1) made up of transistors Q5 and Q6, and then is inverted and applied to the control input (C) of an operation circuit 24''. More specifically, since the transistor Q4 is of the PNP type while the transistor Q3 is of the NPN type, the direction of the collector currents of these transistors are opposite. Therefore, the direction of the collector current is inverted by the current mirror circuit including the transistors Q5 and Q6, and these currents are added at the control input (C) of the DC-DC converter circuit 22. As described above, the circuit arrangement of FIG. 12 can make effective use of the load voltage detected current.

Figure 13:
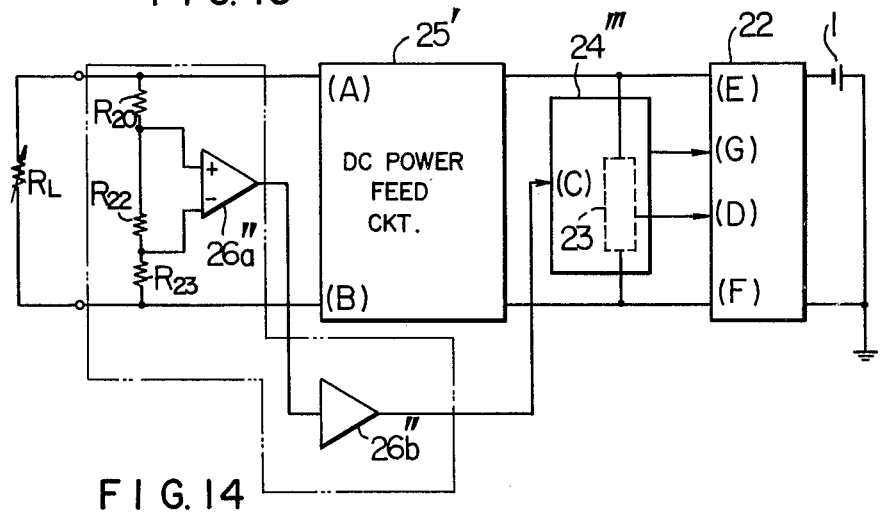

FIG. 13 shows a current supply circuit as a third embodiment of the circuit of FIG. 10. In FIG. 13, the circuit arrangement is exactly the same as that of FIG. 11, except that of the load voltage detecting circuit is made up of a differential amplifier circuit 26a'' and a voltage-current converter circuit 26b''. In FIG. 13, for detecting the load voltage, load voltages divided by the resistors R20, R22 and R23 are applied to the ⊕ and ⊖ input terminals of the differential amplifier 26a''. The differential amplifier 26a'' converts a voltage proportional to the load voltage applied in a balanced manner into an unbalanced output voltage and produces the unbalanced output voltage at the output terminal. The voltage-current converter circuit 26b'' converts a voltage input into a current output. Accordingly, a current input proportional to the load voltage is applied to the control input (G) of an operation circuit 24'''. The differential amplifier 26a'' and the voltage-current converter circuit may be the known corresponding devices, and hence no explanation of these will be given. In the circuit construction shown in FIG. 13, the load detecting voltage circuit is constructed by a circuit arrangement using an operational amplifier as a basic component. Therefore, the load voltage may be detected with extreme accuracy, with the result that the output voltage control of the DC-DC converter circuit may be performed extremely accurately.

Figure 14:
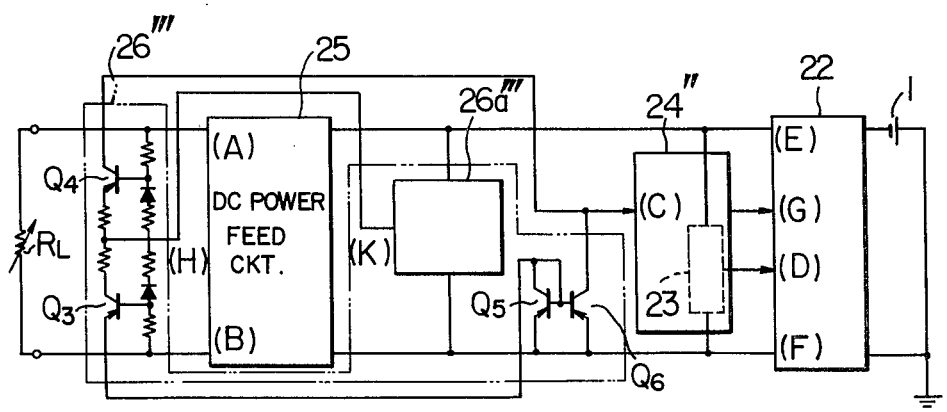

FIG. 14 shows a circuit diagram of a current supply circuit as a fourth embodiment of the circuit shown in FIG. 10. The circuit arrangement shown in FIG. 14 is much the same as that of FIG. 11, except that an imaginary grounding point (H) of the load voltage detecting circuit 26''' is connected to a mid potential point (K) (referred to as a mid point) of the $V_{BB}$, additionally provided. In the load voltage detecting circuit 26' shown in FIG. 12, its input resistance is infinite (the imaginary grounding point is not grounded) for the in-phase mode voltage. Accordingly, the load voltage detecting circuit 26' is insensitive to the in-phase mode voltage. On the other hand, in the load voltage detecting circuit 26''' shown in FIG. 14, its imaginary grounding point (H) is connected to the mid point (K) of the $V_{BB'}/2$ circuit 26a'''. Accordingly, the circuit is sensitive to the in-phase mode voltage, in addition to a normal differential mode voltage. In the event that the subscriber line has a failure and the current supply circuit is directly connected to the point (A) to ground (grounded), the in-phase voltage component in addition to the differential voltage component are applied to the points (A) and (B) in a grounded state of the circuit. As a result, the load voltage detecting circuit 26' shown in FIG. 12 has an insufficient amount of the detected output signal to inaccurately control the output voltage $V_{OUT}$ of the DC-DC converter circuit 22, and the power consumption increases. For this reason, a protective circuit must additionally be required at the time of failure such as grounding. On the contrary, the load voltage detecting circuit 26''' shown in FIG. 14 has a satisfactory sensitivity to the in-phase mode voltage and hence requires no protective circuit for the failure.

As described above, the present invention provides a current supply circuit well fitted for its electronic design with low power consumption. The feature allows the current supply circuit to be fabricated into a single chip. This effect is great from industrial and technical view points.

What is claimed is:

1. A current supply circuit with a constant resistance power feed characteristic for connecting a power source to a load so that said current supply circuit appears to be a constant resistance to said load comprising:
   a. a load current detecting circuit for detecting a load current flowing through the load;
   b. a DC power feed circuit operable independently of said power source and having an equivalent internal resistance and an equivalent internal power supply;
   c. a DC-DC converter circuit inserted in series between the power source and said DC power feed circuit including means for generating an output voltage independently from a voltage output of said power source;

d. a voltage detecting circuit connected to said DC-DC converter circuit for detecting the output voltage of said DC-DC converter circuit; and e. operation circuit means connected to receive the output of said load current detecting circuit and said voltage detecting circuit for controlling said DC-DC converter circuit so as to produce a voltage representative of the sum of a voltage drop across said load and a voltage necessary for allowing said DC power feed circuit to operate in accordance with a change of the load resistance.

2. A current supply circuit according to claim 1, wherein said DC-DC converter circuit is of the self-oscillation switching type.

3. A current supply circuit according to claim 1, wherein said DC-DC converter circuit is of the separate excitation switching type.

4. A current supply circuit with a constant resistance power feed characteristic for connecting a power source to a load so that said current supply circuit appears to be a constant resistance to said load comprising:

a. a first voltage detecting circuit for detecting a load voltage across the load;

b. a DC power feed circuit operable independently of said power source and having an equivalent internal resistance and an equivalent internal power supply;

c. a DC-DC converter circuit inserted in series between the power source and said DC power feed circuit including means for generating an output voltage independently from a voltage output of said power source;

d. a second voltage detecting circuit connected to said DC-DC converter circuit for detecting the output voltage of said DC-DC converter circuit; and e. operation circuit means connected to receive the output of said first voltage detecting circuit and said second voltage detecting circuit for controlling said DC-DC converter circuit so as to produce a voltage representative of the sum of a voltage drop across the load and a voltage necessary for allowing said DC power feed circuit to operate in accordance with a change of the load resistance.

5. A current supply circuit according to claim 4, wherein said first voltage detecting circuit includes:

a. a resistor circuitry having a plurality of series-connected high resistors, which is connected in parallel with the load;

b. a complementary current amplifier having two complementary input terminals inserted in series in said resistor circuitry and two complementary output terminals one of which is connected to ground;

c. a current proportional to a load voltage being produced from the other output terminal of said complementary current amplifier by detecting a current flowing through said resistor circuitry.

6. A current supply circuit according to claim 4, wherein said first voltage detecting circuit includes:

a. a resistor circuitry having a series connection of a plurality of high resistors, which is connected in parallel with the load;

b. a complementary current amplifier having two complementary input terminals inserted in series in said resistor circuitry and two complementary output terminals;

c. a current inverter for inverting the current produced from one of the output terminals of said complementary current amplifier;

d. the output current from said current inverter and the current derived from the outer output terminal of said complementary current amplifier being added to each other to provide a current proportional to the load voltage.

7. A current supply circuit according to claim 4, wherein said first voltage detecting circuit comprising:

a. a resistor voltage divider having a series connection of a plurality of high resistors, which is connected in parallel with the load;

b. a differential amplifier for converting voltage pproduced from said resistor voltage divider into a voltage proportional to a load voltage;

c. a voltage-current converter for converting the voltage from said resistor voltage divider into a voltage proportional to the load voltage; and d. a voltage-current converter for converting the output voltage from said differential amplifier into a current.

8. A current supply circuit according to claim 6, wherein said complementary current amplifier is provided with a single common terminal, a mid point potential generator is provided for providing a voltage half of the output voltage of said DC-DC converter circuit, and said common terminal is connected to said mid point potential generator.

* * * * *